US011971006B2

(12) United States Patent
Montalvo Corral

(10) Patent No.: US 11,971,006 B2
(45) Date of Patent: Apr. 30, 2024

(54) KINETIC PUMPING SYSTEM

(71) Applicant: Gerardo Montalvo Corral, Baja California (MX)

(72) Inventor: Gerardo Montalvo Corral, Baja California (MX)

( * ) Notice: Subject to any disclaimer, the term of this patent is extended or adjusted under 35 U.S.C. 154(b) by 50 days.

(21) Appl. No.: 17/739,179

(22) Filed: May 9, 2022

(65) Prior Publication Data

US 2023/0358203 A1 Nov. 9, 2023

(51) Int. Cl.
*F03B 13/18* (2006.01)

(52) U.S. Cl.
CPC ...... *F03B 13/187* (2013.01); *F05B 2260/301* (2013.01); *F05B 2260/4021* (2013.01); *F05B 2260/60* (2013.01)

(58) Field of Classification Search
CPC ............ F03B 13/187; F05B 2260/4021; F05B 2260/301; F05B 2260/60
See application file for complete search history.

(56) References Cited

U.S. PATENT DOCUMENTS

2018/0112375 A1* 4/2018 Greer .................... E02F 9/2225

* cited by examiner

*Primary Examiner* — Abiy Teka
(74) *Attorney, Agent, or Firm* — Rivka Friedman

(57) ABSTRACT

The present invention relates to a kinetic pumping system that transforms the kinetic energy contained in fluid waves to generate a positive reciprocating displacement flow with control modulation with controlled flow modulation. This system is one more alternative in the green technologies market that contributes to solving the problem of climate change and provides an alternative to eliminate the carbon footprint by replacing traditional fluid pumping systems. Its objective is to provide a pumping system with a positive reciprocating kinetic displacement, capable of generating flow and pressure that can be used or the desalination of seawater and for the generation of electrical energy and that, due to its configuration, overcomes the limitations of conventional systems, including those categorized as land, as well as maritime or coastal. Said system comprises a container tank, a support or chassis, a mobile ramp, an electromechanical activation module, a rotating plate, a mobile part made up of two positive displacement pumps and a sphere for pressure regulation and fluid storage.

6 Claims, 7 Drawing Sheets

200

KINETIC PUMPING SYSTEM

FIELD OF THE INVENTION

The present invention refers to an alternative wave pumping system that transforms the kinetic energy contained in the fluid waves to generate a positive reciprocating displacement with controlled modulation.

BACKGROUND OF THE INVENTION

Fluid pumping systems are those that transform the energy that is supplied to them, generally electrical, into kinetic energy; by increase the pressure, its speed and the volume of fluid displaced increase. There are various types of fluid pumping systems, the most common group is one that works with electricity, gas or fuel oil, this group includes a motor, which through an electromagnetic field induces the rotary mechanical movement to an axis to which a positive displacement pump containing a fluid impeller is coupled, the movement generated by these systems is known as kinetic energy. This type of system is widely used and includes pumps of various kinds, among which are centrifugal bowl pumps that allow the generation of high pressures, and their main field of application is in seawater desalination.

A second group of pumping systems that do not use electrical energy are marine technologies, among which are devices such as Oscillating Water Column (OWC), Wave Energy Converter (WEC), which comprise elements such as Power Take-Off (PTO), either articulated, flood, or otherwise, that they are positioning themselves as an alternative to traditional technologies and work in a maritime and coastal context; in the diversity of devices used are specifically those for pumping fluids used to generate electricity through the articulation of movements of masses of water that move electromechanical systems to generate force and movement; these technologies are composed in their basic concept by two parts, a float and a piston and sleeve assembly, parts that have reciprocating relative movement, such components are activated in the wave energy convertor (WEC) by the wind in the sea, which are then subject to random operation. In turn, this group of pumps includes reciprocating and singular vertical pumps, both reciprocating types, among a variety of systems falling within this category. Reciprocating pumps consist of two sets of pistons articulated at the center of the same balance shaft that allow the variation of opposite height as the waves advance through the mechanism, examples of these inventions are U.S. Pat. Nos. 4,302,161, 4,413,956 and 4,792,290. In vertical pumps, the variation in the height of the wave makes it possible to move its parts along the same axis. The most important antecedent in this type of pump is patent number U.S. Pat. No. 5,842,848.

Some features of the above-described inventions, contrast with the present invention, although all share the basic concept of a reciprocating piston assembly with variable elevation linked to a float activated by the height and frequency of the waves. By contrast, the present invention comprise the following non obvious differences with the prior art: its operation depends precisely on the height and frequency of said waves, which are random (1); the integration of some components to the structure of kinetic pumping systems, in particular the valve actuators are arranged in fluid transfer chambers in different non-aligned positions, in addition to the fact that the relative displacement of the piston caused by the float is reversed, the moving part on top and the hydrodynamically fixed part resistant to sinking on the bottom (2); on the other hand, the verticality of these pumping systems is maintained by means of a hydrodynamically resistant ballast plate located at the lower end of the pumps, coupled with this, the difference in weight between the ballast plate and the float causes the effect of relative fixation (3). In these pumping systems, the float is in the upper part of the pump, so its effort is downward; They also have fluid transfer chambers in the upper part of the float, which has a constant volume and has no capacity for pressure variation or is very limited (4). Finally, another difference between these technologies is that they load the fluids from the top and transfer them into either upward or downward.

SUMMARY OF THE INVENTION

The pumping system of the present invention is an alternative representing an inventive step in the green technology market that contributes to solving the problem of climate change and provides an alternative to eliminate the carbon footprint by replacing traditional fluid pumping systems; The previously mentioned needs are resolved through the present invention, whose purpose is to provide a reciprocating positive displacement kinetic pumping system, capable of generating flow and pressure that can be used for purposes of seawater desalination, and electrical energy generation, and due to its configuration, overcomes existent the limitations of terrestrial and maritime or coastal systems.

The pumping system of the present invention comprises a container tank which is made up of a base, a central body configured to contain the necessary fluid for the proper functioning of the system, in which there is a Lower lateral orifice where a valve is connected to regulate the level, a valve to regulate the level of the fluid inside it. It also contains in the upper part: fluid inlet orifices coupled to pipe assembly flanges, a orifice for the control of excedent fluid and orifices in the upper part for fastening a support or chassis.

The interior of the central part of the container tank has sufficient space for the distribution of the components of the pumping system of the present invention, which are attached to the support or chassis by means of rigid bars or profiles that make up its structure; the support or chassis in turn comprises a base attached to the interior of the central part of the container tank, to allow the fixed and mobile components of the system to remain operating in their position or within the space delimited for this purpose during the pumping movement. The support or chassis also comprises a central frame that reinforces the rigidity of this structural element and that joins the base of the support with an upper part. The upper part of the support or chassis comprises a structure with a length similar to that of the base to allow the fastening of other components of the pumping system.

The support for the flow of fluids, is attached at the bottom to the base of said support and at the top through a slotted arm the mobile ramp is attached to a rotating plate, which in turn allows the movement of the ramp to start and maintain the oscillatory movement of the fluid inside the container tank, the rotating plate is attached to an conveying transmission which allows the articulation of the generated circular movement.

The movement transmitted by the rotating plate to the mobile ramp is generated by an electromechanical activation module, which is attached to the upper part of the support or chassis and to the upper orifices of the container tank. The electromechanical activation module in turn comprises a motor and a transmission, connected through a band, which transmit the movement to the rotating plate through a rotary axis attached to it. The axis is fastened to the chassis by means of bearings and these in turn through mechanical fastening means to the upper part of the support or chassis.

The pumping system of the present invention comprises a mobile part made up of two positive displacement pumps responsible for generating flow and pressure in the fluid inside the tank, which work alternately to reduce flow intermittency to a minimum. The two pumps are held by means of flanges at the top of the support or chassis. The pumps are integrated by a piston and a compensator. The compensator comprises three orifices, one for fluid filling, whose function is to vary the working pressures of the system, another orifice for a valve for air supply with which the amount of ballast (water) is regulated, which in turn is regulates with the compensator working pressure and another orifice for draining the compensator fluid with which the system working pressure is established. Additionally, the piston comprises two parts, a hollow outer guide (312) and an inner hollow piston (311), sealed by means of gaskets, in whose center there is a first valve actuator at the lower end of the inner hollow piston; at the lower end of the piston, it comprises a second valve actuator in which the fluid inlet orifice is located. Both valve actuators comprise a bolt and a sealing sphere, the first one obstructs by flow the relative movement of the second one, while the latter opens and closes the valve actuator inlet to the rhythm of the oscillating fluid column. The components that make up the pumps and their technical characteristics allow the generation of the flow and the filling pressure of the pumping system through its up and down movement, which is induced by the fluid ebb and flow sequence at the flow rate of the oscillating column, which acts as a fluid load unit.

Positive displacement pumps are connected through a piping system to a horizontal tank for pressure and flow equalization between said pumps, particularly through the piston of both pumps. The equalization tank is attached to the upper part of the support or chassis and preferably has four orifices, two of them at the ends of the tank are connected to the positive displacement pumps by means of flanges; a third orifice allows the integration of a pressure gauge to measure the pressure of the fluid; finally, the fourth orifice of the tank is connected at the bottom by means of flanges to a sphere for pressure regulation and fluid storage through piping.

The sphere for pressure regulation and fluid storage comprises a lower central orifice that allows connection to the horizontal tank. Preferably, the sphere comprises three orifices in the upper part: one for high pressure air valve, which constitutes the pneumatic part of the pumping system, a second one for the safety valve, which allows the pressure in the sphere to be compensated, and a third for the pressure gauge that records air pressure. The sphere also comprises two sensors to identify the level of fluid inside the sphere, preferably electro levels, and a level viewer for visual monitoring of the level of fluid inside the sphere.

The sphere is connected to a flange system, which is preferably integrated by a first flange, which fastens the lower central orifice of the sphere to the upper orifice of an integrated cross flange with the aim of integrating the pumping system of present invention into other into other processes or connected to other systems depending on the application or the purpose for which it is intended to be used, through the lateral orifices of said cross flange. The lower orifice of the cross flange is connected through a pipe to the horizontal tank for pressure and flow equalization through one of the upper orifices of the container tank, in such a way that do not interfere with the process inside

BRIEF DESCRIPTION OF THE DRAWINGS

A preferred implementation of the invention is illustrated by the following drawings, which are for illustrative purposes only and are in no way intended to be an exhaustive description of the invention.

DETAILED DESCRIPTION OF THE PREFERRED EMBODIMENT

Figure 1:
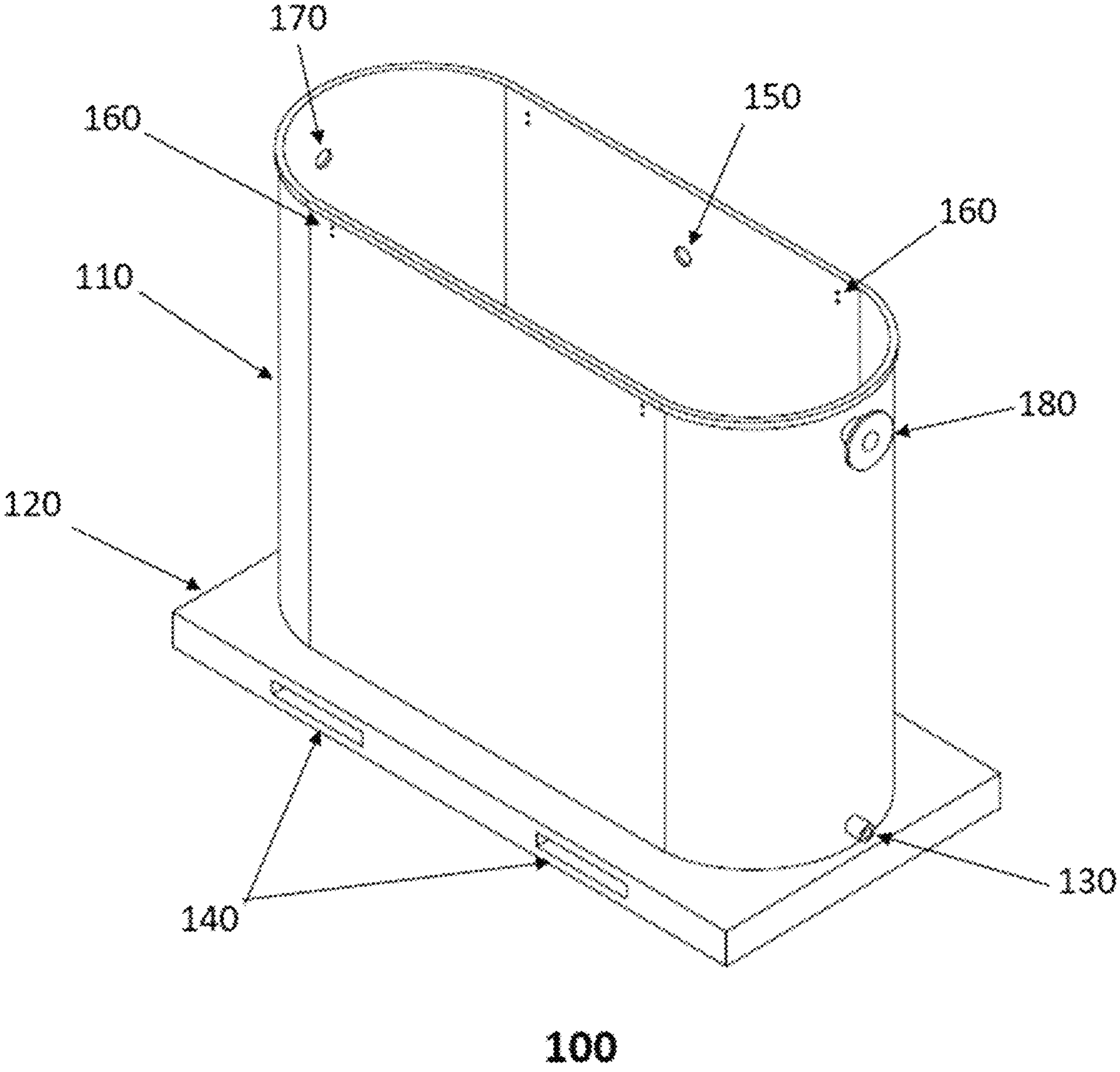
FIG. 1 shows a perspective view of a preferred implementation of the container tank of the kinetic pumping system of the present invention.

The kinetic pumping system (400) comprises: a container tank (100), made of durable, rigid and resistant materials, preferably metallic, which houses all the components of the pumping system of the present invention, while fulfilling the function of storage of the fluid that will be pumped during its operation, more preferably water to process, in addition to said container tank (100) is where the oscillatory movement of the fluid generates a column from which the kinetic energy with which the pumping system operates is extracted; a support or chassis (200), made of rigid and resistant materials, preferably metallic, to which the various components that are placed inside and on top of the container tank (100) of the system are attached, which are secured through mechanical fastening, preferably by means of flanges or screws; a mobile ramp (240) for the impulse of fluids with which the movement of water masses is generated during the operation of the system, said movement is useful for the generation of kinetic energy; an electromechanical activation module (250) whose function is to provide the initial effort, generating a column of fluid from the oscillatory movement inside the container tank (100) during the operation of the pumping system; a rotating plate (260), of rigid materials, preferably metallic, with which the circular movement is transformed into a rotative movement with which the mobile ramp (240) works for the impulse of fluids, said a rotative movement displaces the mass of water inside of the container tank (100) and makes it possible for the generation of a column of fluid from the oscillatory movement to occur; a horizontal tank for the equalization of fluids (320) where the flows generated during the operation of the system of the present invention are mixed, in an intermittent fashion, said tank gives this system the characteristic of continuous flow; two positive displacement pumps (340), performing the function of driving the fluids in the system with a certain flow and a certain pressure, which in turn is established in the design of each unit depending on its purpose and need; a sphere for pressure regulation and fluid storage (330), fulfilling the function of stabilizing the flows and pressures that are necessary depending on the use made of the pumping system of the present invention; the horizontal tank (320), the two pumps (340) and the sphere (330) are joined by means of rigid and/or flexible tubes, as well as through other means of connection existing in the state of the art, preferably through flanges.

Figure 7:
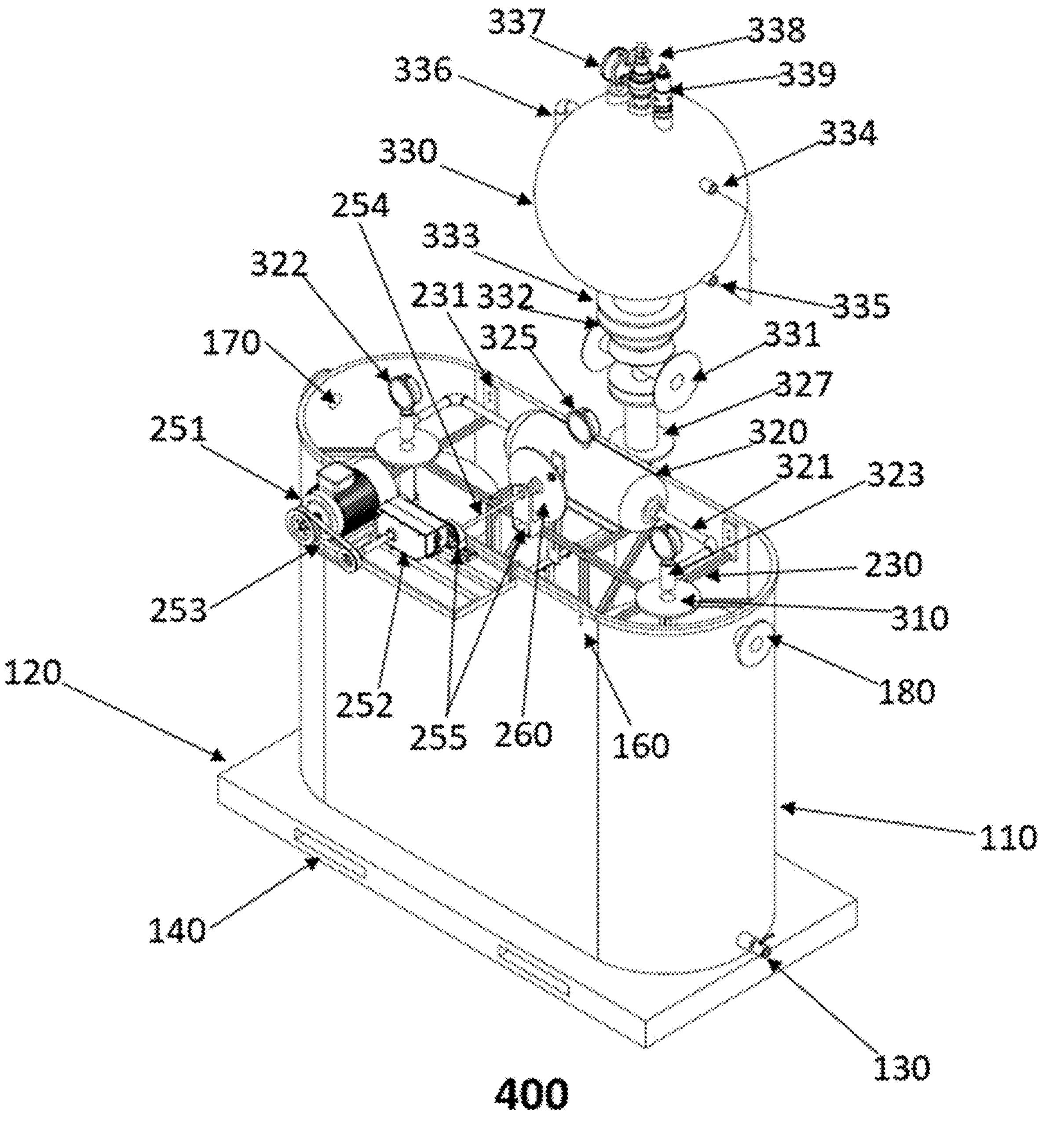
FIG. 7 shows a perspective view of a preferred implementation of the pumping system of the present invention with all its components.

FIGS. 1 and 7 illustrate a preferred implementation of the container tank (100) of the kinetic pumping system (400) of the present invention, which in turn comprises a base (120) that provides stability during the pumping process and that facilitates the position movement in the place where it is installed and a central body (110) with rigid walls high enough to contain the components of the system and the necessary fluid to generate the reciprocating positive displacement movement; the container tank (100) is made of rigid and resistant materials existing or to exist in the state of the art, preferably metallic.

The base (120) can take any shape that allows it to fulfill its function and secure the other elements of the container tank (100), preferably the base (120) is rectangular and has orifices (140) to facilitate its transfer. The central body (110) can take any shape that allows it to fulfill its function, preferably it takes the shape of a state or disc-rectangle (rectangular with rounded corners), and is attached to the base (120), through the means known or to be known in the state of the art, preferably through the welding technique, with which both elements are joined in a single body.

The central body (110) comprises a series of orifices (130, 150, 160, 170) on the surface of its walls, a first orifice (130) is arranged, preferably in the lower lateral part of the central body (110) and its function is to regulate the level of the fluid inside the container tank (100), allowing the fluid to be emptied or maintained up to the level required for the proper functioning of the system; whereby a valve, preferably of the ball type, is attached to said orifice (130) through known or unknown means. Preferably in the upper part of the walls of the central body (110) some orifices (150, 160, 170) are arranged that allow the securing of some components of the pumping system of the present invention, preferably said orifices are arranged, two (170) at the shorter ends of the central body (110) and one (150) at one of the longer walls. Out of those orifices, some (150) (170) and (180) are at different heights. The remaining orifices (160) are arranged in pairs, at each of the ends of the longest walls of the central body (110), so that they coincide in position and height. In the orifices (170) they allow the entry of fluids and to these are attached, preferably pipe assembly flanges (180).

Figure 2:
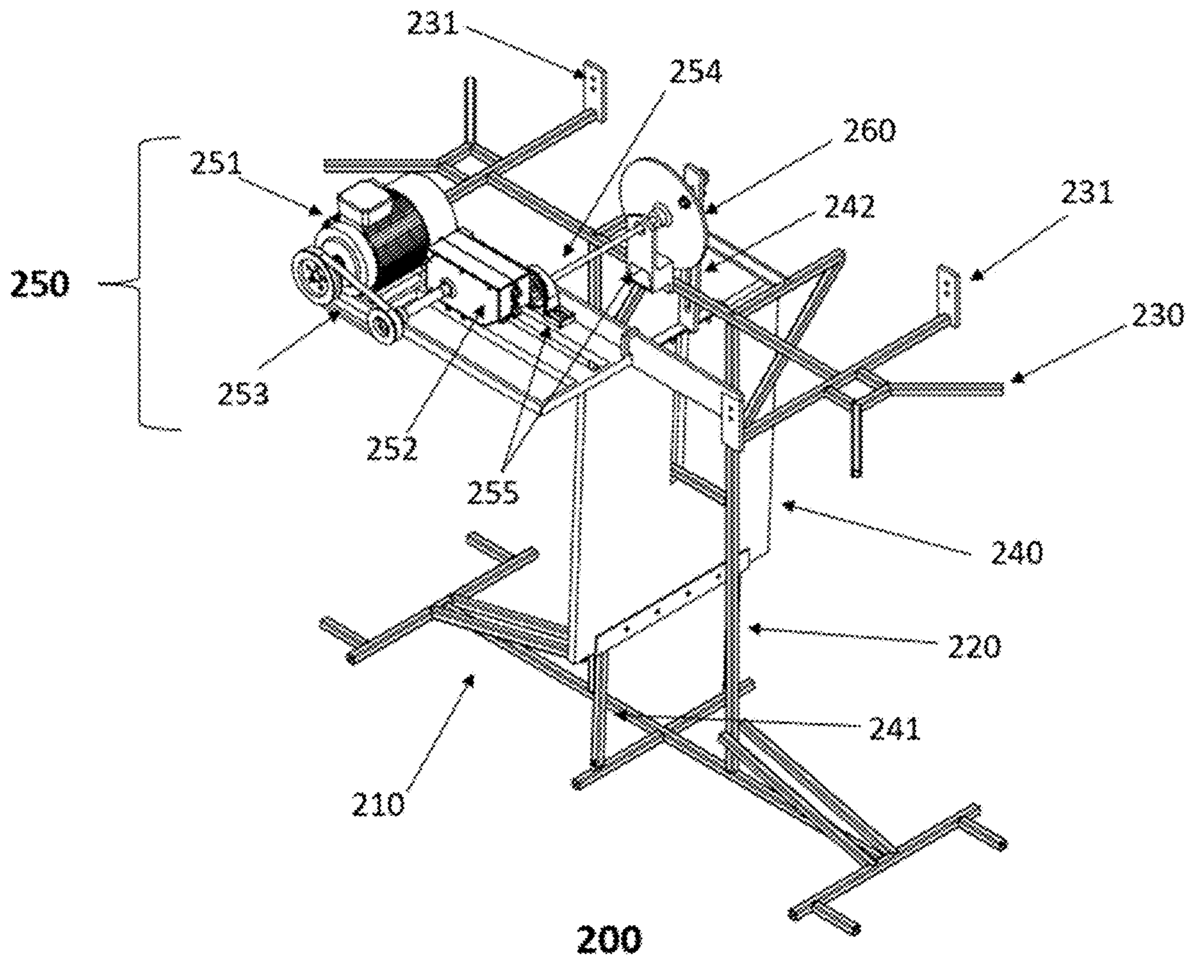
FIG. 2 shows a perspective view of a preferred implementation of the support or chassis with the electromechanical activation module, the mobile ramp, the rotating plate of the pumping system of the present invention.
Figure 3:
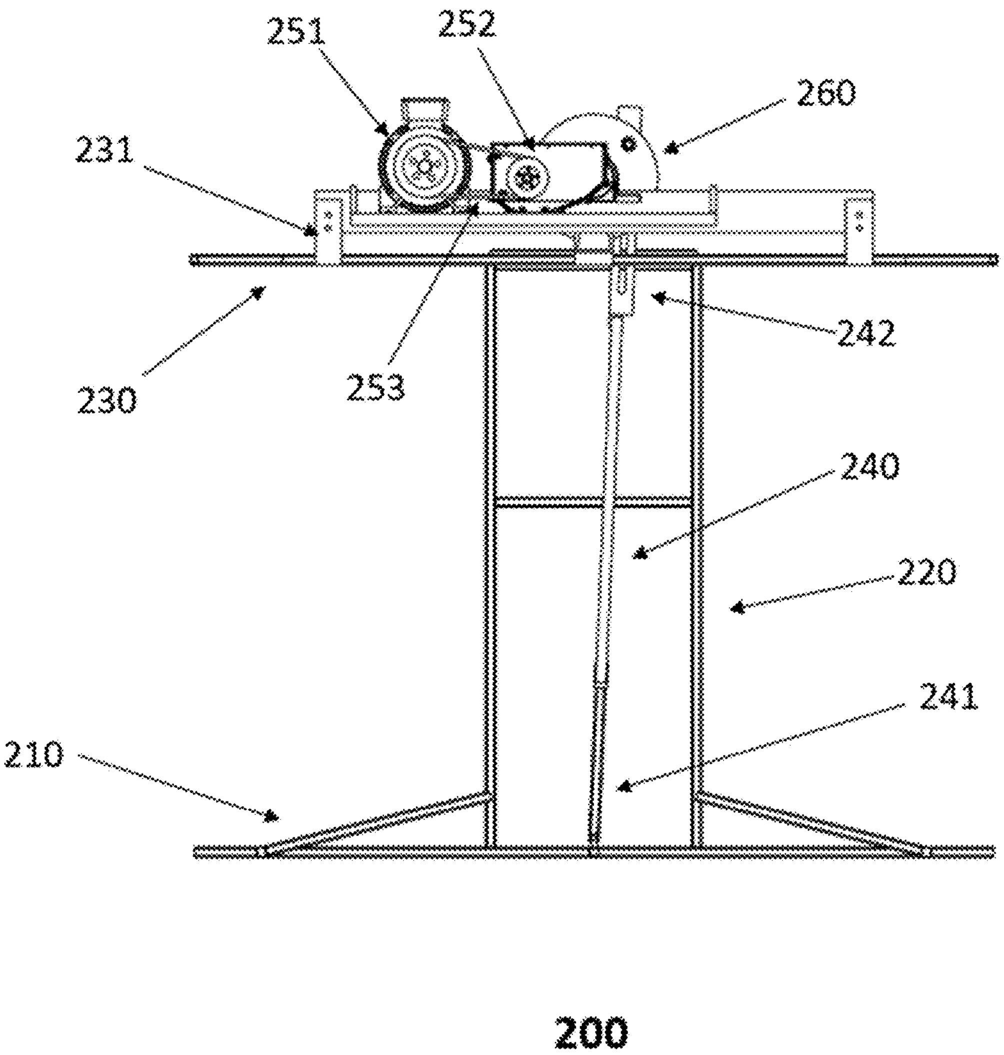
FIG. 3 shows a front view of a preferred implementation of the support or chassis with the electromechanical activation module, the mobile ramp, the rotating plate of the pumping system of the present invention.
Figure 4:
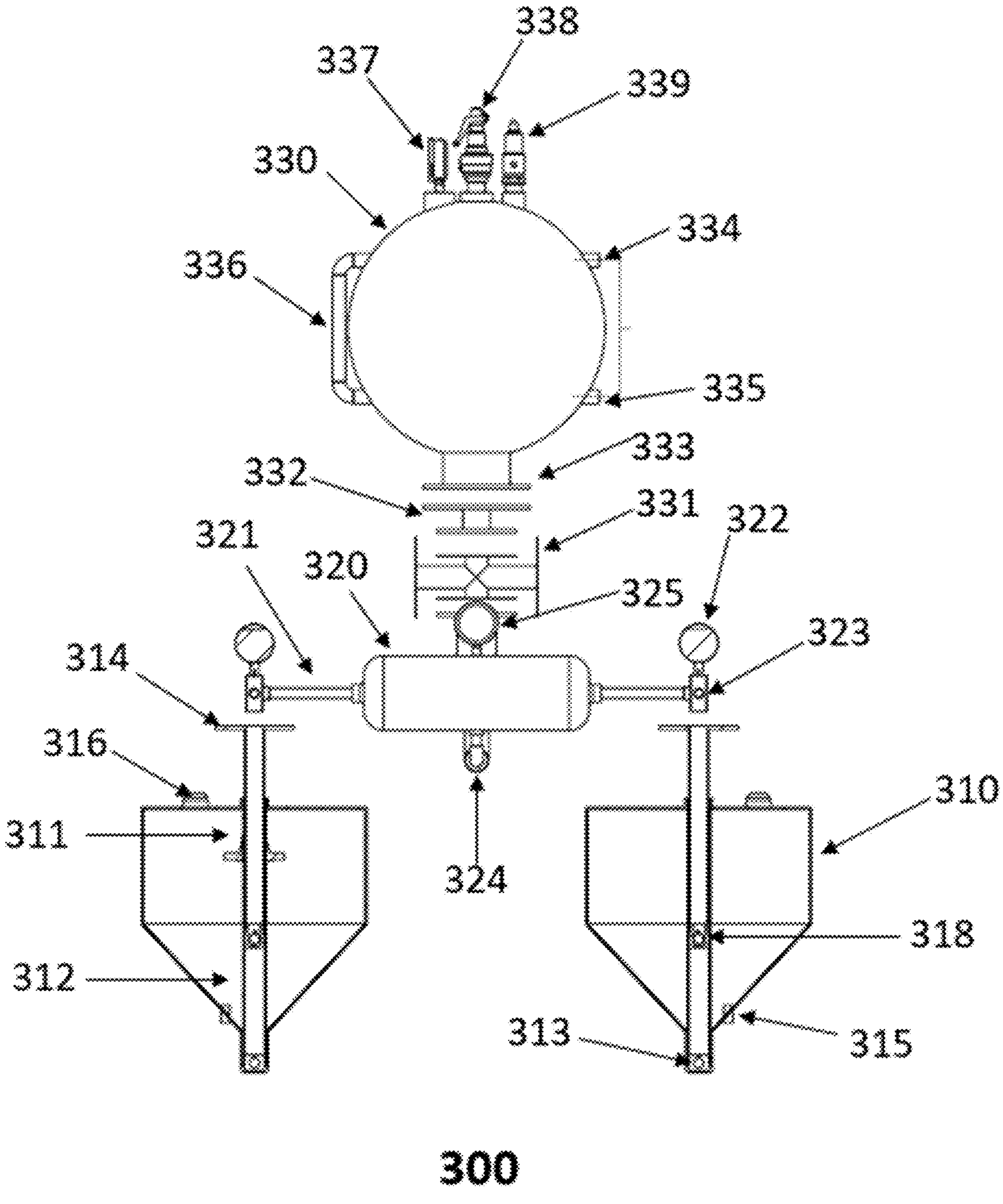
FIG. 4 shows an exploded front view of a preferred implementation of the mobile part of the pumping system of the present invention, particularly of the two positive displacement pumps, the sphere for pressure regulation and fluid storage, the horizontal tank for pressure and flow equalization, as well as their respective connections.
Figure 5:
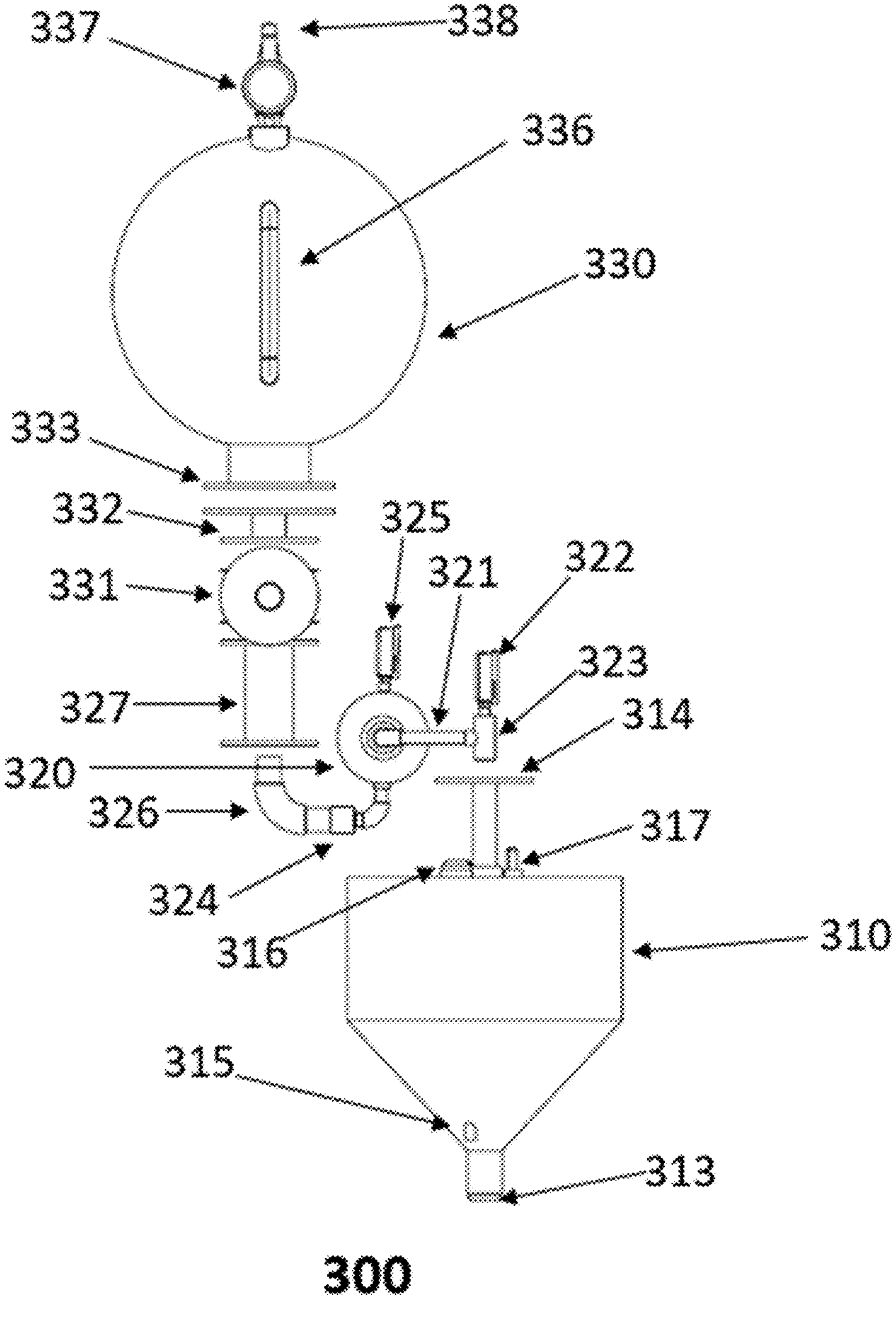
FIG. 5 shows an exploded side view of a preferred implementation of the mobile part of the pumping system of the present invention, particularly of the two positive displacement pumps, the sphere for pressure regulation and fluid storage, the horizontal tank for pressure and flow equalization, as well as their respective connections.
Figure 6:
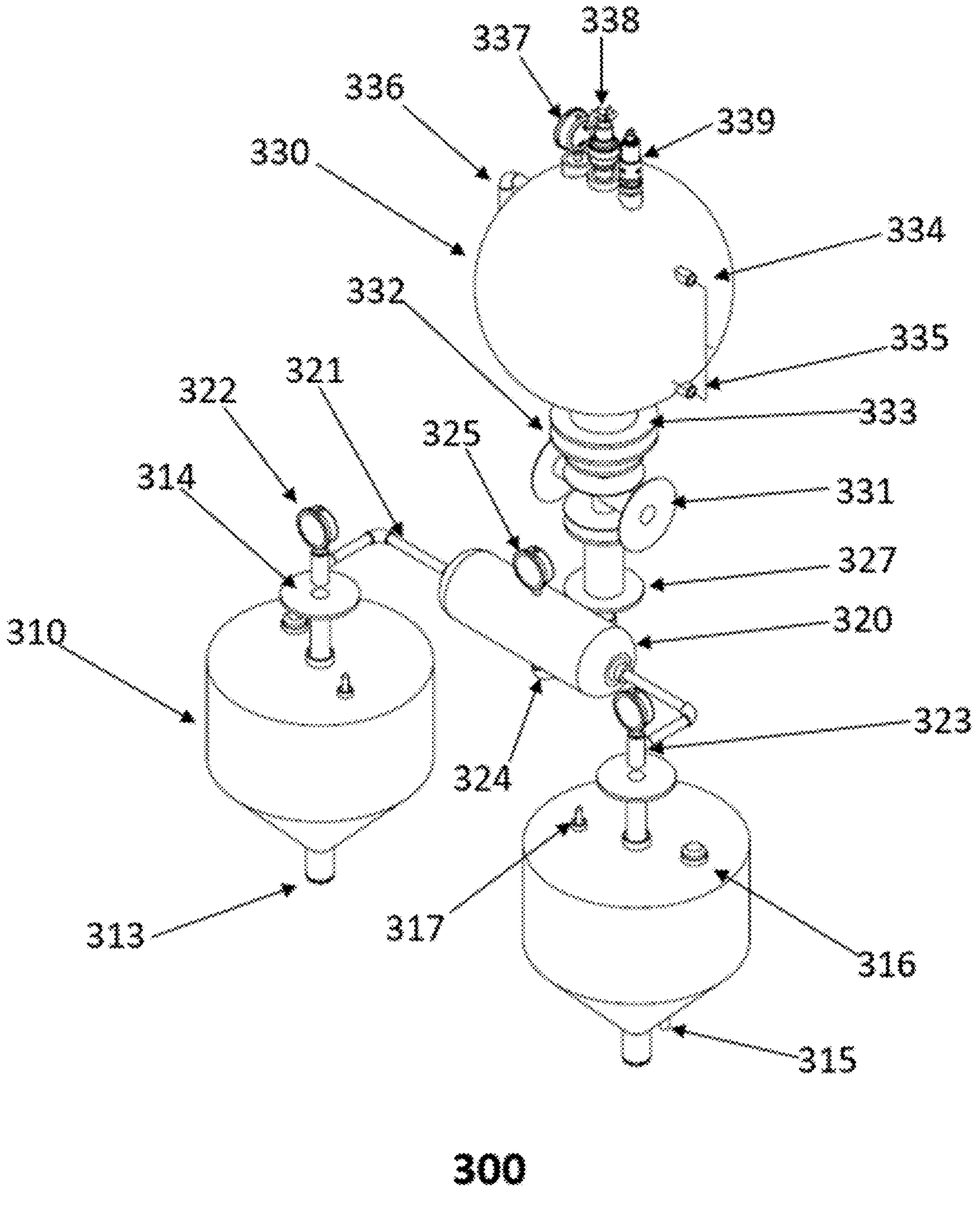
FIG. 6 shows a perspective view of a preferred implementation of the mobile part of the pumping system of the present invention, particularly of the two positive displacement pumps, the sphere for pressure regulation and fluid storage, the horizontal tank for pressure and flow equalization, as well as their respective connections.

FIGS. 2, 3 and 7 illustrate a preferred embodiment of the support or chassis (200), which is made up of rigid bars or profiles, preferably metallic, to which some components of the kinetic pumping system (400) are attached. through known or unknown means. The support or chassis (200) comprises a base (210) attached to the interior of the central part (110) of the container tank (100), through known fastening means or to be known, to allow during the pumping movement the fixed and mobile components of the system are kept working in their position or within the space delimited for this purpose. The support or chassis (200) also comprises a central frame (220) that provides it with rigidity and that joins the base (210) of the support with an upper part (230). The upper part (230) of the support or chassis (200) comprises a structure with a length similar to that of the base (210), but with the necessary composition and configuration to allow other components of the pumping system to be attached.

FIGS. 2, 3 and 7 illustrate a preferred embodiment of the electromechanical activation module (250), which is responsible for sending the signal to start and keep constant the movement of the fluid inside the container tank (100). This module comprises an electric motor (251), a transmission (252), a band (253) and a rotary axis (254).

Preferably, the motor (251) is chosen from those known or to be known in the state of the art and its power will depend on the dimensions of the pumping system of the present invention, as well as the needs of the process implemented by it. More preferably, motor (251) is one-third horsepower (⅓ hp) and is coupled to transmission (252) via belt (253). The transmission (252) is a low-revolution, high-torque unit that gives the system the necessary effort to generate the energy-based column of fluid from the oscillatory movement of this system. The rotary axis (254) is made of rigid and resistant materials known or to be known, preferably steel, its function is to transmit the relative circular movement that is generated in the transmission (252) The electromechanical activation module (250) is subject to the structure of the upper part (230) of the support or chassis (200) through known or to be known mechanical fastening means; preferably said module (250) is fixed on a base of bars or profiles secured to the upper part of the central body (110) of the container tank (100) through mechanical fastening means (231) in the orifices (160) arranged in the upper part of the longest walls of said central body (110).

FIGS. 2, 3 and 7 illustrate a preferred embodiment of the rotating plate (260), made of rigid and resistant materials, preferably metallic, its function is to transmit the movement received by the axis (254) of the electromechanical activation module (250), which is attached to one of its faces through known or unknown fastening means, which allows the transformation of the circular movement of the rotating plate (260) into ebb and flow sequence when it is transmitted to the components of the system that are attached to it. Preferably, the rotating plate (260) has, on the opposite face to which the axis (254) is attached, with fixing points arranged from the outside to the inside of the rotating plate (260), which allow the variation of the ebb and flow sequence, as well as adjusting the amount of horizontal displacement of the fluid impulse ramp (240), so that it provides a variable displacement.

FIGS. 2 and 3 illustrate a preferred embodiment of the mobile ramp (240), made of rigid and resistant materials known or to be known, preferably metallic; Its function is to drive the fluid into the container tank (100), which creates a column of fluid from the oscillatory movement that allows the production of flow and pressure in the system. Preferably, the mobile ramp (240) is fastened at its lower end to the base of the support or chassis (210) and inside the central body (110) of the container tank (100) through known mechanical fastening means or to be known (241), preferably through rigid profiles equal or similar to those that make up the support or chassis (200); at its upper end the mobile ramp (240) is attached to a slotted arm (242), through mechanical fastening means; said slotted arm (242) is fastened to the rotating plate (260) through its fixing points, preferably by means of a bolt that adjusts the arm (242) on the rotating plate (260) but at the same time keeps its free to perform the circular movement by displacing the clamping bolt through the slot in the arm (242) with certain degrees of freedom. The movement transmitted by the rotatory axis (254) to the rotating plate (260) is in turn transmitted to the mobile ramp (240), generating its movement and, in turn, the horizontal movement of the fluid contained inside the container tank. (100).

FIGS. 4, 5, 6 and 7 illustrate a preferred implementation of the mobile part (300) of the kinetic pumping system (400) of the present invention, which is made up of two positive displacement pumps (340) that generate flow and pressure in the fluid, which work alternately to reduce intermittent flow to a minimum. The two pumps (340) in turn comprise a piston (314) and a compensator (310); the compensator comprises three orifices, one for filling fluid (315), a valve for air supplying that regulates the ballast level (317) and a orifice for draining fluid from the compensator (315); for its part, the piston comprises two parts, a hollow outer guide (312) and an inner hollow piston (311), sealed by means of gaskets, in the center of which there is a first valve actuator (318); the lower end of the piston comprises a second valve actuator (313) in which the fluid inlet orifice is located; Both valve actuators comprise a bolt and a sealing ball, the first obstructs the relative movement of the second, while the latter opens and closes the inlet of the actuator valve to the rhythm of the column of fluid's oscillating movement.

The components that make up the pumps and their technical characteristics allow the generation of the flow and the pressure of the pumping system through its up and down movement, which is induced by the fluid filling-emptying-filling sequence at the rate of flow of the column of fluid generated from the oscillatory movement, which acts as a fluid load unit. The positive displacement pumps are connected through a third valve actuator (323) and a piping system (321) to a horizontal tank for pressure and flow equalization (320) located between said pumps.

Preferably, the horizontal tank for equalization (320) is attached to the upper part of the support or chassis and preferably has four orifices, two of which are connected to the positive displacement pumps through the third valve actuator (323) and the pipe (321); in turn, the third valve actuator (323) comprises inside a bolt and a ball for sealing, the first obstructs the relative movement of the second, while the latter opens and closes the valve actuator inlet to the rhythm of the column of fluid generated from the oscillatory movement; as well as a pressure gauge (322) for registering the pressure generated by the positive displacement pumps; a third orifice of the horizontal tank (320) allows the integration of a manometer for measuring the pressure of the fluid inside (325); Finally, the fourth orifice of the tank connects it to the sphere (330) for pressure regulation and fluid storage through the pipe (324).

FIGS. 5, 6, 7 and 10 illustrate a preferred embodiment of the sphere for pressure regulation and fluid storage (330), which comprises a lower orifice (333), through which it is connected to the horizontal tank for pressure and flow equalization (320) by means of a flange system; Likewise, it comprises three orifices in the upper part which house a high pressure air valve (337) that constitutes the pneumatic part of the pumping system, a safety valve (338) that allows compensating the pressure in the sphere and a pressure gauge (339) that registers the air pressure. On its sides, the sphere (330) can include two sensors (334 and 335) to identify the level of the fluid inside the sphere, preferably electro levels, and a fluid level viewer (336) for visual monitoring of the fluid level inside the sphere.

The flange system that connects the sphere (330) with the horizontal tank (320), preferably consists of a first flange (332), which holds the lower central orifice (333) of the sphere (330) to the upper orifice of an integrated cross flange (331) with the objective that the pumping system of the present invention could be integrated into further processes or connected to other systems depending on the application or the purpose for which it is intended to be used, through the side orifices of said cross flange (331); the lower orifice of the cross flange (331) is attached to the upper orifice of a duct with two flanges (327), which in turn is connected to a piping system (326 and 324) attached to the lower orifice of the horizontal tank (320), preferably in the duct with two flanges (327) a fourth valve actuator can be integrated.

The invention claimed is:

1. A kinetic pumping system comprising:

a container tank (100) for the storage of a fluid and where a column of fluid from oscillatory movement is generated, wherein the tank (100) comprises a base (120) to provide stability and a central body (110) with rigid walls high enough to contain components of the kinetic pumping system and fluid necessary for operation of the kinetic pumping system;

a support or chassis (200) which is made up of rigid bars or profiles and comprises a base (210) attached inside of the central body (110) of the container tank (100); a central frame (220) that provides rigidity and joins the base (210) of the support with an upper part (230), which has a length similar to that of the base (210);

an electromechanical activation module (250) which comprises an electric motor (251) with one-third horsepower (⅓ hp), which is coupled to a transmission (252) of low revolutions and high torque by means of a belt (253) and a rotatory axis (254) in charge of transmitting circular movement generated in the transmission (252);

a rotating plate (260) having a first face and a second face, wherein the first face is attached to the rotatory axis (254) and the second face has points that facilitate fixing and allow horizontal displacement to be adjusted;

a mobile ramp (240) which is attached at a lower end thereof to the support or chassis (200) and inside the central body (110) of the container tank (100) through rigid profiles; an upper end of the mobile ramp (240) joining a slotted arm (242), which is fastened to the rotating plate (260) through the points that facilitate fixing by means of a bolt;

two positive displacement pumps (340);

a sphere for pressure regulation and fluid storage (330);

a horizontal tank (320) which is attached to an upper part (230) of the support or chassis (200) and has four orifices, two of the four orifices connected to one of the positive displacement pumps (340) through a third valve actuator (323), which in turn comprises a pressure gauge (322), and a pipe (321); another of the four orifices is connected to a manometer for measuring the pressure of the fluid (325); and another of the four orifices connects the horizontal tank (320) to the sphere (330) for pressure regulation and fluid storage through tubing (324);

wherein each of the two positive displacement pumps (340) comprises a piston (314) and a compensator (310), where the compensator (310) in turn comprises three orifices, one orifice for fluid filling (315), another orifice that is a valve for the supply of air that regulates an amount of ballast (317), and another orifice for draining fluid from the compensator (315); the piston (314) comprises two parts, a hollow outer guide (312) and an inner hollow piston (311), in which there is a first valve actuator (318); the hollow outer guide (312) comprises a second valve actuator (313) in which a fluid inlet orifice is located;

wherein the sphere for pressure regulation and fluid storage (330) comprises a lower orifice (333), through which the sphere is connected to the horizontal tank (320) by means of a flange system, and three orifices which house a high pressure air valve (337), a safety valve (338) that allows compensating the pressure in the sphere and a pressure gauge (339) registering air pressure; the sphere (330) comprises on a side thereof two sensors (334 and 335) to identify level of fluids inside the sphere including electro levels, and a fluid level viewer (336) for visual monitoring of the level of fluids inside the sphere.

2. The pumping system of claim 1 wherein the central body (110) comprises a series of orifices (130, 150, 160, 170), a first orifice (130) is arranged, in the lower lateral part of the central body (110), a valve is attached to said orifice (130); other orifices (150, 160, 170) on the central body (1109 allow the securing of other components of the system, two orifices (170) are arranged on the central body (110) and one orifice (150) in one of the walls; the other orifices (160) are arranged in pairs, at each of the ends of the walls of the central body (110), so that they coincide in position and height; for their part, the orifices (170) are coupled with pipe assembly flanges (180).

3. The pumping system of claim 1 wherein the electromechanical activation module (250) is fastened to the bars or profiles of the upper part (230) of the support or chassis (200) through mechanical fastening means (231) in the orifices (160) arranged in the upper part of the longest walls of the central body (110) of the container tank (100).

4. The pumping system of claim 1, wherein the valve actuators (318 and 313) comprise a bolt and a ball for sealing, the bolt obstructs the movement of the ball, while the ball opens and closes the valve actuator inlet to the rhythm of the column of fluid generated from the oscillatory movement.

5. The pumping system of claim 1, wherein the valve actuator (323) comprise a bolt and a ball for sealing, the bolt obstructs the movement of the ball, while the ball opens and closes the valve actuator inlet to the rhythm of the column of fluid generated from the oscillatory movement.

6. The pumping system of claim 1 wherein the flange system of the sphere (330) is made up of a first flange (332), which holds the lower central orifice (333) of the sphere (330) to an upper orifice of a cross flange (331) to allow the integration of the system to other processes or the connection with other systems, through the orifices of said cross flange (331); the lower orifice of the cross flange (331) is attached to the upper orifice of a spool with two flanges (327), which in turn is connected to a piping system (326 and 324) attached to the lower orifice of the horizontal tank (320).

* * * * *